Patented Aug. 23, 1949

2,479,943

UNITED STATES PATENT OFFICE 2,479,943

ALPHA THIONYLAMINOANTHRAQUINONE AND PROCESS FOR MAKING SAME

Hans Z. Lecher, Plainfield, and Dale Raymond Eberhart, Bound Brook, N. J., assignors to American Cyanamid Company, New York, N. Y., a corporation of Maine No Drawing. Application February 5, 1947, Serial No. 726,736

12 Claims. (Cl. 260—378)

This invention relates to a process of purifying crude alpha aminoanthraquinone and to the production of a new compound, thionylaminoanthraquinone.

Alpha aminoanthraquinone is prepared by various methods, one of the most economical and widely used involving the amination of anthraquinone alpha sulfonic acid with ammonia under pressure. This method, while economical, suffers from a very serious disadvantage that the alpha aminoanthraquinone produced contains impurities which are very undesirable for certain purposes and are also difficult to remove.

While impure alpha aminoanthraquinone may be used for certain purposes, the presence of the impurities precludes its use as an intermediate for certain valuable dyestuffs. For example, yellow colors of great commercial importance may be obtained by the reaction of halogen derivatives of 1,3,5-triazines, such as cyanuric chloride, on the alpha aminoanthraquinone. The importance of these colors lies in their unusual brightness. However, for example, when cyanuric chloride is reacted with alpha amino anthraquinone containing the usual impurities, the desired bright green-yellow shade is seriously dulled. This change in shade renders the product unacceptable to the trade.

Because of the economy of production of alpha aminoanthraquinone by the amination of the alpha sulfonic acid, numerous attempts have been made in the past to remove the undesirable impurities. These methods, however, have either been ineffective or very expensive and time consuming, which has precluded their practical use. One example of such a method is fractional crystallization, which will not result in sufficient removal of the impurity without involving excessive losses of the crude alpha aminoanthraquinone.

According to the present invention the crude alpha aminoanthraquinone is purified by transforming it into alpha thionylaminoanthraquinone by reaction with thionyl chloride, followed by filtration and regeneration of the purified amine.

Alpha thionylaminoanthraquinone has the following formula:

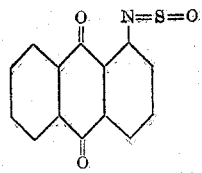

Its preparation is preferably effected in a suitable inert organic solvent in which the thionylaminoanthraquinone is soluble but the impurities are not. The inertness of the solvent is of course a prerequisite because of the extraordinary reactivity of thionyl chloride which would be used up if a solvent were employed which reacted with it. The process may be effected advantageously by refluxing the aminoanthraquinone and thionyl chloride in the inert solvent, followed by hot filtration, preferably in the presence of decolorizing material such as decolorizing carbon.

The filtrate which is free from the undesirable impurities and contains the bright green-yellow thionylaminoanthraquinone, may be treated in various ways to recover the thionylaminoanthraquinone from it, for example, evaporation procedures are effective. Since the thionylaminoanthraquinone is normally not used as a dyestuff intermediate but is usually first hydrolyzed to regenerate the alpha aminoanthraquinone, we have found that a very efficient and economical process avoids the isolation of the thionylaminoanthraquinone. In this process the amino compound is obtained directly in a pure form from the filtrate by hydrolyzing with water and acid. A particularly advantageous modification involves steam distillation of the organic solvent, which removes the solvent, hydrolyzes the thionylaminoanthraquinone, and produces a water suspension of pure alpha aminoanthraquinone. It is remarkable and unusual that the solution of alpha thionylaminoanthraquinone can be used directly without isolation or removal of the solvent for reaction with acid chlorides such as cyanuric chloride to produce dyestuffs and intermediates. For example, the yellow dye, 2,4,6-(tri-alpha-anthraquinonylamino)-1,3,5-triazine, can be prepared by adding cyanuric chloride to a solution of alpha thionylaminoanthraquinone prepared in situ. The dye has the following formula:

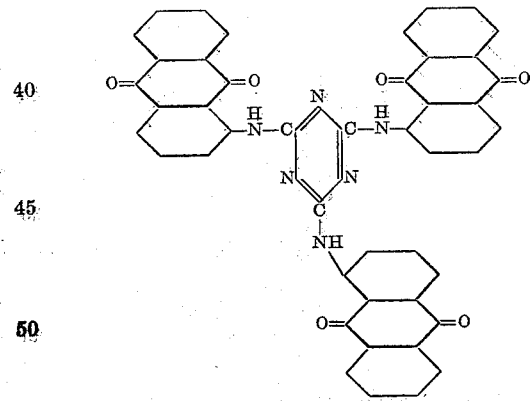

The organic solvent used in the present invention must not be reactive to thionyl chloride and to the amine, it must dissolve the thionylaminoanthraquinone and it must not be a good solvent for the impurities which do not react with thionyl chloride. This restricts the solvents which can be used somewhat, but still permits the employment of a wide class of common solvents of which the chlorinated aliphatic hydrocarbons, such as carbon tetrachloride, ethylene chloride, acetylene tetrachloride, and the like, and aromatic hydrocarbons such as benzene, are typical examples. The above solvents are given as examples of the cheapest and most satisfactory members of their groups, and may be considered the preferred solvents.

The thionylaminoanthraquinone which is produced in the present process is itself a new chemical compound and is included as part of the present invention.

The invention will be described in greater detail in conjunction with the following examples, which are illustrative. All parts are by weight.

Example 1

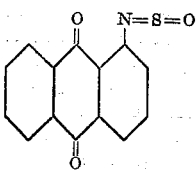

A mixture of 14 parts of impure alpha aminoanthraquinone, 11 parts of thionyl chloride, and about 250 parts of carbon tetrachloride is refluxed until reaction is complete. About one part of decolorizing carbon is added and the reaction mixture filtered. The bright orange filtrate, upon cooling, deposits yellow crystals of alpha thionylaminoanthraquinone. These crystals are filtered and washed with carbon tetrachloride.

Example 2

A mixture of 67 parts of crude alpha aminoanthraquinone (preferably from the sulfonic acid), 57 parts of thionyl chloride, and 450 parts of benzene is refluxed for 1½–2 hours. About one part of decolorizing carbon is added, and the reaction mixture is filtered. To the filtrate is added about 20 parts of alcohol. The orange-tan precipitate produced is filtered and washed with benzene. This cake is suspended in water, the benzene steamed out, and the hot slurry filtered and washed acid-free. The filter cake is dried, giving a high recovery of very pure alpha aminoanthraquinone.

Example 3

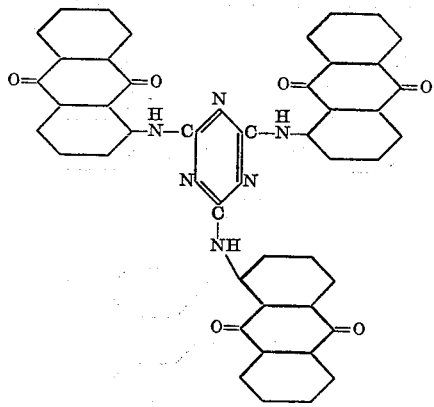

A mixture of about 16 parts of crude alpha aminoanthraquinone (preferably prepared from the sulfonic acid by amination), 380 parts of carbon tetrachloride, and 10 parts of thionyl chloride is stirred and refluxed for three hours. The mixture is cooled slightly, two grams of decolorizing carbon is added; and the stirring and refluxing continued for an additional 2½, 3 hours. The reaction mixture is filtered while hot into another reaction vessel.

To the filtered solution obtained as described above are added 3.8 parts of cyanuric chloride and 190 parts of phenol. The mixture is heated to 110° C. and held at this temperature for such a time as to allow substantially all the carbon tetrachloride to distill from the reaction. The temperature is then raised to about 150° C. and maintained for three hours. After cooling, about 200 parts of ethyl alcohol is added. The slurry is filtered and the cake washed with alcohol and dried. The yellow dye is obtained in extremely high yield and has dyeing qualities much superior to those of the dye from unpurified aminoanthraquinone. This dye, when prepared from alpha aminoanthraquinone purified by our new process is a pure green-yellow equal in shade to that made from the intermediate after complete purification by expensive and lengthy methods whereas the unpurified alpha aminoanthraquinone gives a dye of a much duller color.

We claim:

1. Alpha thionylaminoanthraquinone.
2. A process for the preparation of alpha thionylaminoanthraquinone which comprises reacting alpha aminoanthraquinone with thionyl chloride in an inert organic solvent at elevated temperatures.
3. A process according to claim 2 in which the alpha aminoanthraquinone is the crude product obtained from the amination of the corresponding anthraquinone sulfonic acid and the solvent used has low solvent power for the impurities present, and the reaction mixture is filtered hot and the alpha thionylaminoanthraquinone recovered from the resulting filtrate.
4. A process for purifying alpha aminoanthraquinone which comprises reacting the impure alpha aminoanthraquinone with thionyl chloride at an elevated temperature in an inert organic solvent having good solvent action for alpha thionylaminoanthraquinone and low solvent action for impurities, and filtering the reaction mixture and hydrolyzing the thionyl compound.
5. A process for purifying alpha aminoanthraquinone which comprises reacting impure alpha aminoanthraquinone obtained by the amination of the corresponding sulfonic acid with thionyl chloride at elevated temperatures in an inert organic solvent having good solvent action on the thionyl aminoanthraquinone and low solvent action on the impurities, filtering the reaction mixture and hydrolyzing the alpha thionylaminoanthraquinone.
6. A process for purifying alpha aminoanthraquinone which comprises reacting impure alpha aminoanthraquinone obtained by the amination of the corresponding sulfonic acid with thionyl chloride at elevated temperatures in an inert organic solvent having good solvent action on the thionyl aminoanthraquinone and low solvent action on the impurities, filtering the reaction mixture and hydrolyzing the alpha thionylaminoanthraquinone by steam distillation of the organic solvent.
7. A process according to claim 2 in which the organic solvent is benzene.
8. A process according to claim 2 in which the organic solvent is carbon tetrachloride.
9. A process according to claim 5 in which the organic solvent is benzene.
10. A process according to claim 5 in which the organic solvent is carbon tetrachloride.

11. A process according to claim 6 in which the organic solvent is benzene.

12. A process according to claim 6 in which the organic solvent is carbon tetrachloride.

HANS Z. LECHER.
DALE RAYMOND EBERHART.

REFERENCES CITED

The following references are of record in the file of this patent:

FOREIGN PATENTS

| Number | Country | Date |
|---|---|---|
| 268,592 | Germany | Dec. 20, 1913 |

OTHER REFERENCES

Michaelis "Liebigs Annalen," vol. 274, pages 178–182 (1893).

Anschutz et al. "Liebigs Annalen," vol. 493, page 242 (1932).